United States Patent [19]
Rune

[11] Patent Number: 6,151,495
[45] Date of Patent: Nov. 21, 2000

[54] GRAN ACCESS PORT ADDRESSING METHOD AND APPARATUS

[75] Inventor: Johan Rune, Lidingö, Sweden

[73] Assignee: Telefonaktiebolaget LM Ericsson, Stockholm, Sweden

[21] Appl. No.: 09/168,715

[22] Filed: Oct. 8, 1998

[30] Foreign Application Priority Data

Oct. 10, 1997 [SE] Sweden .................................. 9703696

[51] Int. Cl.[7] ...................................................... H04Q 7/20
[52] U.S. Cl. .......................... 455/426; 455/428; 455/432; 455/445; 455/461
[58] Field of Search .................................... 455/428, 461, 455/445, 426, 432; 370/230, 401, 338, 95.3

[56] References Cited

U.S. PATENT DOCUMENTS

| 5,475,689 | 12/1995 | Kay et al. ............................... 370/95.3 |
| 5,629,974 | 5/1997 | Rajala et al. . |
| 5,666,348 | 9/1997 | Thornberg et al. ..................... 370/230 |
| 5,828,959 | 10/1998 | Soderbacka ............................. 455/445 |
| 5,850,444 | 12/1998 | Rune ........................................ 705/79 |
| 5,862,481 | 1/1999 | Kulkarni et al. ......................... 455/432 |
| 5,901,352 | 5/1999 | St-Pierre et al. ........................ 455/426 |
| 6,018,657 | 1/2000 | Kennedy, III et al. ................. 455/426 |
| 6,038,439 | 3/2000 | Rune ....................................... 455/406 |
| 6,052,589 | 4/2000 | Persson et al. .......................... 455/426 |

FOREIGN PATENT DOCUMENTS

| 0 697 798 | 2/1996 | European Pat. Off. . |
| WO 96/34504 | 10/1996 | WIPO . |
| WO 97/16936 | 5/1997 | WIPO . |

OTHER PUBLICATIONS

PCT International Search Report dated Jan. 19, 1999.

*Primary Examiner*—Curtis A. Kuntz
*Assistant Examiner*—Barry W. Taylor
*Attorney, Agent, or Firm*—Jenkens & Gilchrist

[57] ABSTRACT

The present invention relates generally to the problem of finding the correct access port when an access attempt is made by a subscriber belonging to a core network that can not change access port for a particular subscriber. For core networks without support for terminal mobility, a certain subscriber is always accessed through the same access port. If a user moves far away from his "home access port" the access attempt will be unnecessarily rejected because the GRAN normally routes the connection to the closest access port. The present invention solves this problem by placing mapping tables in the IWUs to map core network subscriber identities to access port addresses. This mapping information is then used to route the access attempt to the correct access port. If the subscriber identity does not belong to either the accessed access port nor is it listed on the mapping table, the user is considered outside his allowed area and the access attempt is rejected.

24 Claims, 4 Drawing Sheets

GRAN ACCESS PORT ADDRESSING METHOD AND APPARATUS

FIELD OF THE INVENTION

The present invention relates generally to the problem of mobility in the Generic Radio Access Network (GRAN), and more particularly to the problem of finding the correct access port when an access attempt is made by a subscriber belonging to a core network that can not change access port for a particular subscriber.

RELATED ART

A Generic Radio Access Network ("GRAN") can be described as a radio access network with a generic interface to which any type of core network (e.g. GSM, ISDN, PSTN, Internet, etc.) can connect. See FIG. 1. The basics of a GRAN have been described in PCT/SE96/00510, "METHOD AND ARRANGEMENT FOR INCREASING THE RANGE FOR A TELECOMMUNICATION NETWORK IN A TELECOMMUNICATION SYSTEM." It is part of the ongoing development of a Universal Mobile Telecommunications System ("UMTS") within the European Telecommunications Standards Institute ("ETSI").

UMTS has been described as a 'third-generation' mobile communications system, as compared with current mobile systems like GSM which are referred to as 'second-generation.' UMTS is a broadband multimedia system that will support all that current wired and wireless technology can offer and have the ability to support new applications that are common to both, or unique to UMTS. Thus, UMTS is seen as a way of facilitating the convergence of wired and wireless networks as seamlessly as possible.

In terms of today's technology, UMTS can be thought of as having many different faces: PLMN, PSTN, wireless PABX, wireless LAN, RLL, private mobile radio, satellite systems, paging networks, mobile data networks, etc. Since the UMTS aids access between these networks, parts of the UMTS 'network' will be installed and operated by competing telecommunications operators. Other parts will be under private ownership. It is therefore foreseen that roaming between different zones under different ownership, probably resulting in a changing tariff scheme, will be supported in the UMTS environment.

One result of UMTS is that the access network responsible for communication with terminals over the air interface may be independently owned and operated from those who own and operate as service providers. For example, a GSM user may access the GSM network through an independent access network in the UMTS. Similarly, a customer of the PSTN at home may also access the PSTN through the same, or perhaps a different, access network.

There will thus be a need in the UMTS of a radio access network with a generic interface to which any type of core network can connect. That is the concept of the GRAN, as described in PCT/SE96/00510 and shown in FIG. 1. The mobile cellular network may be owned and operated by an access provider, the GRAN operator, by providing access to the service providers over the air interface. The GRAN operator will have no subscribers of its own, but will be merely providing access to the core network service providers for their subscribers.

Figure 1:
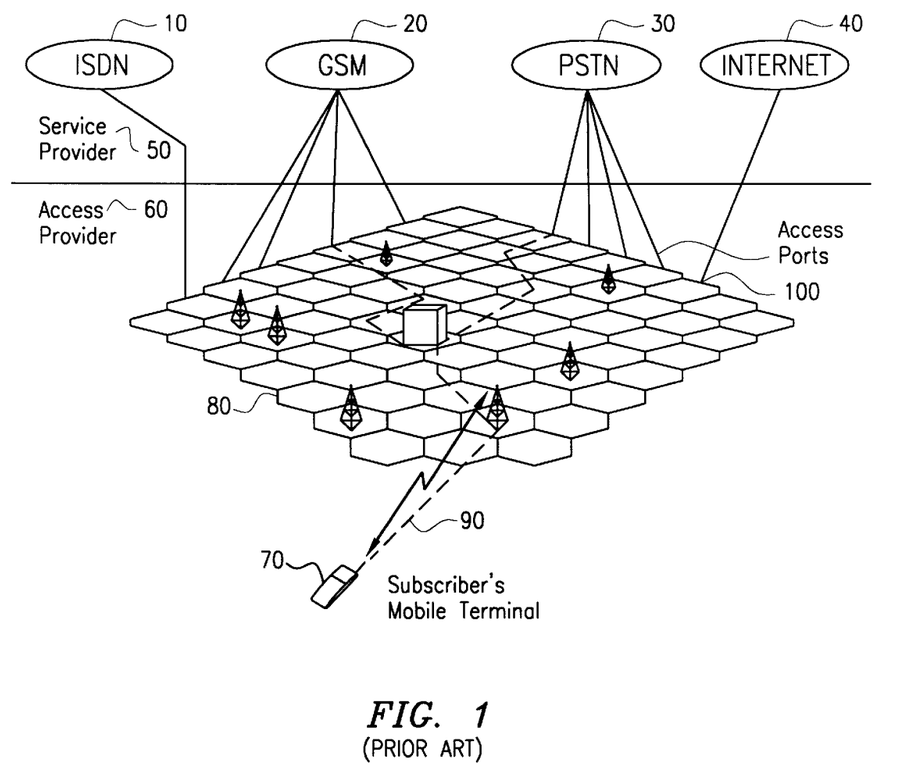
FIG. 1 is a drawing of a cellular mobile communications system where several service providers provide services over a cellular network operated by an access provider.
Figure 2:
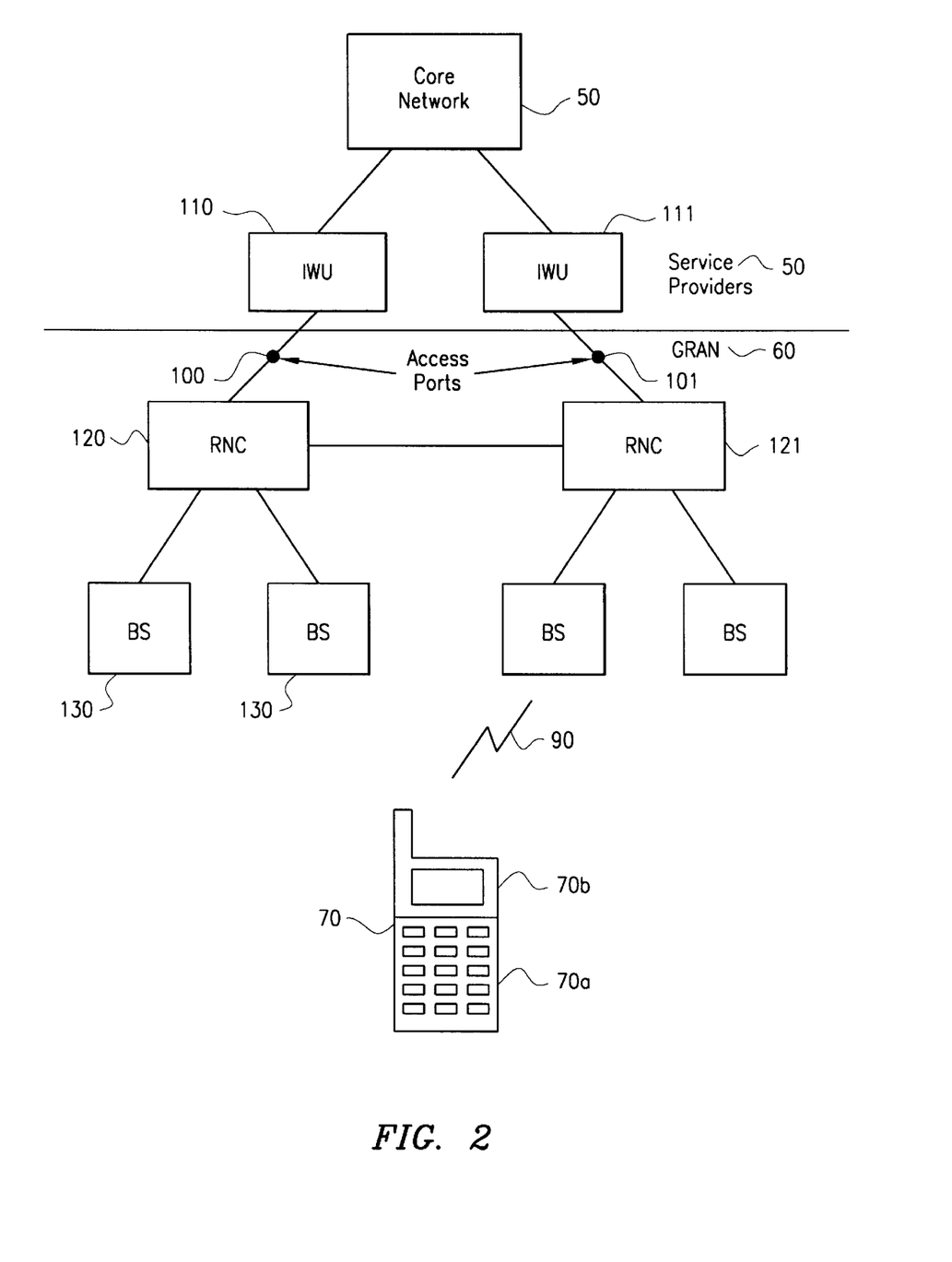
FIG. 2 is a diagram of the system of shown in FIG. 1.

Each of the core networks will be able to access the cellular network, the GRAN, through one or more 'access ports' as shown in FIG. 1 and FIG. 2. These access ports will then be connected to Radio Network Controllers ("RNC") which control the various base stations in the cellular network. The individual subscribers to the various service providers will be provided access to their service provider through appropriate base stations.

A diagrammatic view of this system can be seen in FIG. 2. Future core networks may be tailored to fit the generic interface, but existing core networks will have to use an interworking unit ("IWU") between itself and the GRAN. The terminals used while accessing the GRAN will consist of one part that logically belongs to the GRAN and a second part that logically belongs to the core network. Between these two parts there may be an interworking part that can handle both core network specific and GRAN specific identifiers and parameters.

Core network subscribers can access their respective core network through the GRAN, which is done using bearer services that the GRAN offers the core networks. Thus, two major purposes of the GRAN are to extend the ranges of existing core networks and to provide wireless access and mobility to their subscribers.

As mentioned above, the GRAN has no subscribers. Only the core network service providers have subscribers. The GRAN is also independent of the service control signalling used by the service providing operators. It does, however, provide basic terminal control, including: idle mode control, basic access with control establishment to the service providing network associated with the terminal and service, and resource control with handover control and performance.

Between the core networks and the GRAN there are interworking functions. These interworking functions can be regarded as belonging to either the GRAN, the core networks, or neither of them. The interworking functions provide mapping between core network specific and GRAN specific identifiers and parameters.

For core networks without support for terminal mobility, a certain subscriber is always accessed through the same access port e.g. 100. For core networks which do support terminal mobility a subscriber can be accessed through any of the access ports to which the core network is connected. Normally the one that provides the shortest route through the GRAN will be used. The GRAN's internal mobility management will be used to support the local mobility, while the mobility management of the core network will be used to realise a change of access port in the core network.

In a situation where the core network is not able to change access port certain problems can arise. If the user's terminal moves far away from his "home access port" (i.e. the access port 100 or 101, through which he communicates with the core network 50), many inter-RNC connections may result. This is inefficient and may prove costly for both the core network operator and the user.

To avoid long connections such as these in the GRAN, the core network may limit the user's mobility to a certain area. However, it is still possible that within that area the home access port e.g. 100, 101, may not be the one closest to the user at all times. If a user tries to register with the core network when another access port than his home access port is the closest, then there is a problem. This is due to the fact that the GRAN normally routes the connection to the closest access port to which the requested core network is connected.

In this situation the access attempt would be unnecessarily rejected. The problem is that the GRAN must have a way to find the correct access port. There is no current solution to this problem in the proposed specifications. However, a simple and straightforward solution would be to load the address of the correct home access port in the terminal, or in some kind of subscriber identity module, at the time of subscription.

But if the correct home access port is stored in a subscriber identity module the result would be that a core network specific piece of equipment would have to be able to handle a GRAN specific identifier. This would violate the principles of the GRAN since core network specific equipment should not have to be adapted to the GRAN.

Similarly, if the correct port address were stored in the terminal itself, it would unnecessarily inhibit user mobility, since any user would not be able to use the terminal. Both of these solutions result in lost flexibility, since data in the terminal or the subscriber identity module would have to be changed if the address of the home access port is changed in the network.

SUMMARY OF THE INVENTION

Accordingly, it is the object of the present invention to meet the problem of enabling the GRAN to find the correct access port when a user tries to register with the core network when another access port than his home access port is the closest. The present invention approaches this without resorting to storing the home access port in either the terminal or in some kind of subscriber identity module.

A better solution to the problem of finding the correct access port when an access attempt is made by a subscriber belonging to a core network that can not change access port for a particular subscriber is to let the IWUs 110, 111 as shown in FIG. 2, contain mapping tables to map core network 50 subscriber identities to access port 100, 101, addresses. These mapping tables can then be used to direct the access attempts to the correct access port 100, 101, in two ways.

In the first method, the user requests access to the core network 50 and the request for a signalling connection is routed by the GRAN 60 to the closest access port 100, 101, as usual. In the initial message to the GRAN 60 the subscriber identity is included and transferred, uninterpreted by the GRAN 60, to the IWU 110, 111, at the closest access port 100, 101, together with the request for a signalling connection. If the IWU 110, 111, does not recognise the core network 50 subscriber identity as belonging to that access port 100, 101, then it will check in its table to find the correct port address for that core network 50 subscriber identity. Instead of merely rejecting the access attempt, the IWU 110, 111, will return the correct port address to the RNC 120, 121, and the access attempt will be routed by the RNC 120, 121, to that access port 100, 101, and the core network 50 access is successfully performed.

In the second method the user requests access to the core network 50 and a request for a signalling connection is routed by the GRAN 60 to the closest access port 100, 101. A signalling connection is established between the interworking part of the terminal 70 and the IWU 110, 111, at the closest access port 100, 101. Through this signalling connection the core network 50 subscriber identity is transferred to the IWU 110, 111. If the IWU 110, 111, does not recognise the core network 50 subscriber identity as belonging to that access port 100, 101, it will check in its table to find the correct port address for that core network 50 subscriber identity. The correct port address is then transferred to the interworking part of the terminal through the established signalling connection. The signalling connection is then released and the terminal performs a new access attempt, this time explicitly addressed to the correct access port 100, 101, and the core network 50 access is successfully performed.

The advantages of these solutions to the problems include the fact that access attempts from users of core networks 50 without terminal mobility support can be routed to the correct access port 100, 101, even when there is another access port closer to the user. This is done without the core network specific parts having to handle any GRAN specific identifiers, and the GRAN does not have to interpret any core network specific identifiers.

The first method which meets the stated objectives is defined according to the appended.

BRIEF DESCRIPTION OF THE DRAWINGS

The present invention will now be described in more detail with reference to preferred embodiments of the present invention, given only by way of example, and illustrated in the accompanying drawings, in which.

DETAILED DESCRIPTION

The present invention addresses a situation that can occur in systems using a GRAN 60 as shown in FIG. 2 wherein the core network 50 is not able to change access ports 100, 101, for a user. A user accessing the core network 50 using his or her terminal 70 does so through a particular home access port. Normally the GRAN 60 routes an access request to the closest access port 100, 101, to which the requested core network 50 is connected.

Therefore, if the user terminal 70 has moved away from the home access port, the GRAN 60 will route the connection to an access port 100, 101, that is not the home access port. This non-home access port must have some way to find the correct access port 100, 101, for this particular user terminal 70 and particular core network 50.

This will be done by using a mapping table in each IWU 110, 111. Each IWU 110, 111, will have a table that maps core network subscriber identities to access port addresses. The size of such a table can be kept relatively small, since the use of restricted mobility (i.e. allowing the subscriber to roam in only a limited area around its home access port) reduces the number of subscriber identities and access port addresses that need to be stored in each IWU 110, 111. Also, intelligent subscriber identity schemes, e.g. hierarchical ISDN number plans, helps to keep the mapping tables small. These mapping tables in the IWUs 110, 111, can be used to direct the access attempt to the correct access port in two ways according to the present invention.

Figure 3:
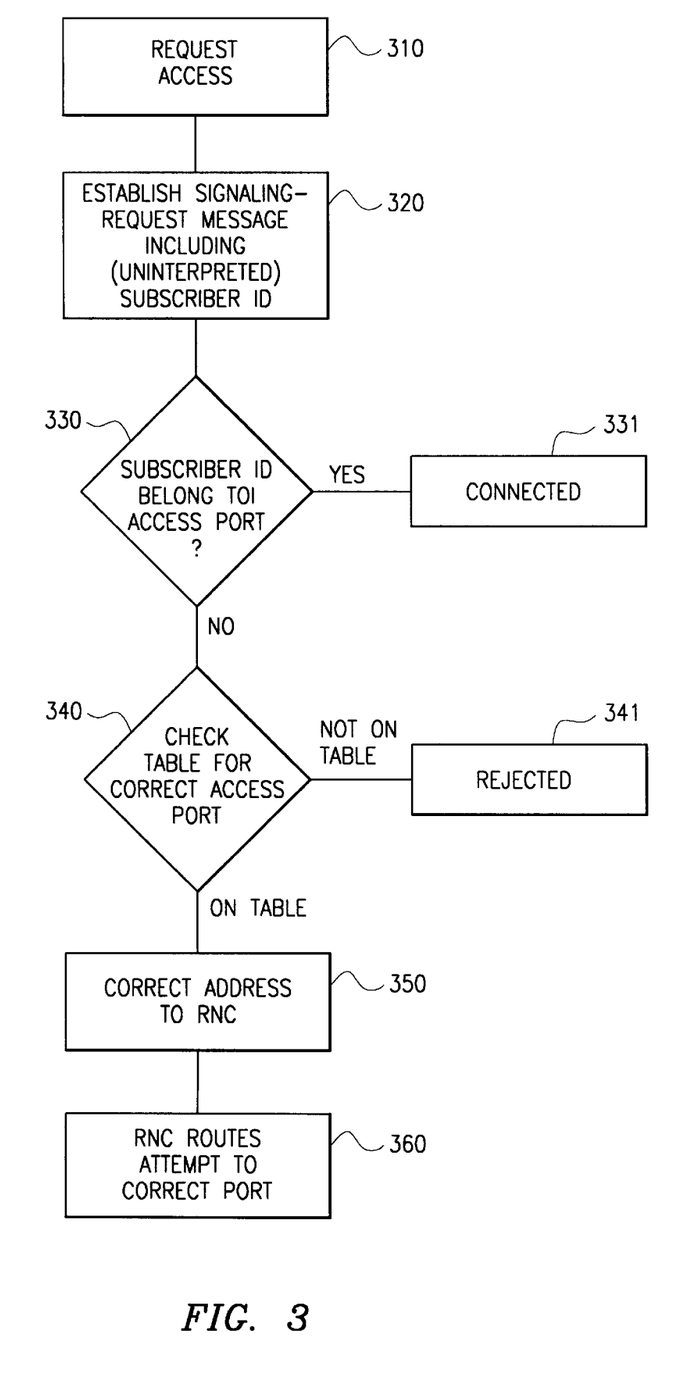
FIG. 3 is a flowchart illustrating the steps of the method in the preferred embodiment of the present invention.

The first way of directing an access attempt according to the present invention is shown by the flowchart in FIG. 3. The user requests access 310 to the core network 50 and the request for a signalling connection is routed by the GRAN 60 to the closest access port 100, 101, as usual. In the initial message to the GRAN 60 the subscriber identity is included and transferred, uninterpreted by the GRAN 60, to the IWU 110, 111, at the closest access port 100, 101, together with the request for a signalling connection. If it does then a signalling connection is established 331 to the core network 50. This would be the situation where the terminal 70 is attempting access at its own home access port 100, 101.

If the subscriber identity does not belong to this particular access port, then the IWU 110, 111, will check 340 its mapping table to check which access port maps to this particular subscriber identity. Either the subscriber identity will be found on the table or it will not. If it is not found on the table, then the access attempt will be rejected 341. If the core network subscriber identity does not belong to the access port 100, 101, and it does not appear in the mapping table either, the user is considered to be either outside his or her allowed area or regarded as a fraudulent caller.

If the subscriber identity is found on the table, the IWU 110, 111, will retrieve the correct access port 100, 101, address. This correct access port 100, 101, address will then be returned 350 to the RNC 120, 121, which will then reroute 360 the access attempt to the correct access port 100, 101, where the signalling connection will be established and the access attempt will be successfully completed as normal. In this embodiment of the present invention the RNC 120, 121, is the receiver of the correct port address from the IWU 110, 111, and the RNC 120, 121, makes sure that the access attempt is routed to the correct access port 100, 101. The terminal 70 does not need to be informed about this process.

However, it is also possible for the correct access port address to also be passed to the terminal 70, where it could be cached in the interworking part of the terminal 70. It could then be used for explicit access port addressing in subsequent access attempts by the same user in the same GRAN 60.

Figure 4:
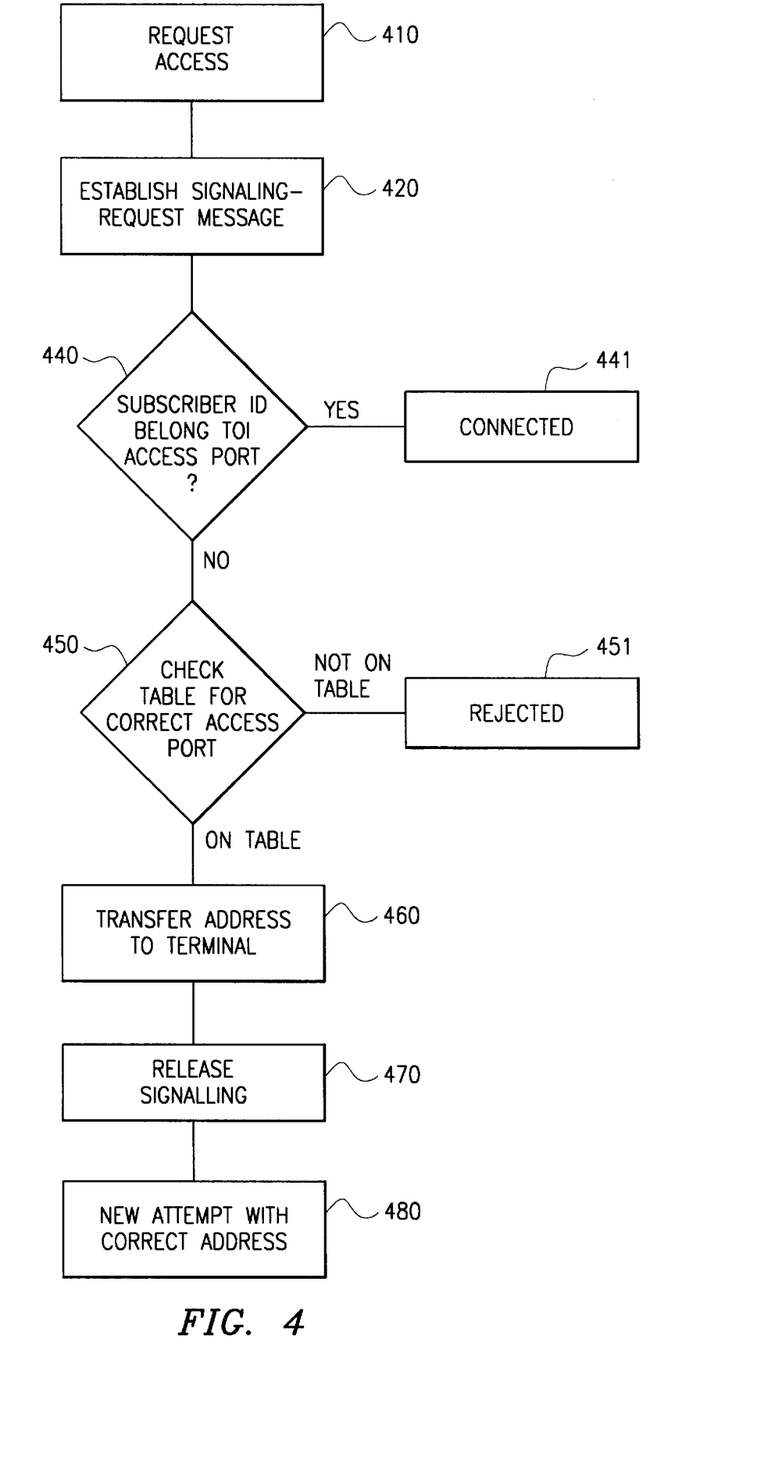
FIG. 4 is a flowchart illustrating the steps of the method in an alternative embodiment of the present invention.

A second embodiment of the way of directing an access attempt according to the present invention is shown by the flowchart in FIG. 4. The user requests access 410 to the core network 50 and the request for a signalling connection is routed by the GRAN 60 to the closest access port 100, 101, as usual. Signalling between the interworking part 70*a* of the terminal 70 and the IWU 110, 111, at the closest access port 100, 101, is then established 420.

Although there is an initial message to the GRAN 60 and a resulting request for a signalling connection to the core network 50, in this embodiment the core network subscriber identity is not transferred to the IWU 110, 111, as part of this process. Instead, a signalling connection is established between the IWU 110, 111, at the closest access port 100, 101, and the interworking part of the terminal. Via this signalling connection the interworking part of the terminal transfers the core network subscriber identity (e.g. ISDN number) to the IWU 110, 111, which then checks to see if the subscriber identity belongs to this particular access port 100, 101. If it does, then a signalling connection is established between the core network specific part 70*a* of the terminal and the core network 50 and the signalling between the core network specific part 70*a* of the terminal and the core network 50 continues as normal. This would be the situation where the terminal 70 is attempting access at its own home access port 100, 101.

If the subscriber identity does not belong to this particular access port, then the IWU 110, 111, will check 450 its mapping table to check which access port maps to this particular subscriber identity. Either the subscriber identity will be found on the table or it will not. If it is not found on the table, then the access attempt will be rejected 451. If the core network subscriber identity does not belong to the access port 100, 101, and it does not appear in the mapping table either, the user is considered to be either outside his or her allowed area or regarded as a fraudulent caller.

If the subscriber identity is found on the table, the IWU 110, 111, will retrieve the correct access port 100, 101, address. This correct access port 100, 101, address will then be transferred 460 to the interworking part of the terminal 70 through the established signalling connection. The signalling connection is then released 470 and the terminal 70 performs a new access attempt, this time explicitly addressed to the correct access port, and the core network 50 access is successfully performed.

The interworking part of the terminal 70 may also cache the address of the correct address port to be used in subsequent access attempts by the same user in the same GRAN 60. In this embodiment of the present invention the IWU 110, 111, in the network and the interworking part of the terminal 70 are communicating to determine the correct access port 100, 101 for the user.

The embodiments described above serve merely as illustration and not as limitation. It will be apparent to one of ordinary skill in the art that departures may be made from the embodiments described above without departing form the spirit and scope of the invention. The invention should not be regarded as being limited to the examples described, but should be regarded instead as being equal in scope to the following claims.

What is claimed is:

1. In a Generic Radio Access Network (GRAN) serving as a possible information bearer to a plurality of core networks, wherein each of said core networks has at least one subscriber having a mobile terminal and wherein at least one type of subscriber mobile terminal consists of one GRAN specific part that logically belongs to the GRAN and one core network specific part that logically belongs to the core network, a method for redirecting a core network access request transmitted by a core network subscriber terminal from a first access port to a second access port wherein at least the second access port is connected to said subscriber's core network, comprising the steps of:

receiving, at a first interworking unit (IWU) connected to said first access port, a request for access to said subscriber's core network from said subscriber terminal wherein said request is included and transferred, uninterpreted by the GRAN as part of an initial message;

transmitting, from said first IWU to a first radio network controller (RNC), the address to the second access port;

redirecting, from said first RNC, said request for access to said subscriber's core network to the second access port according to the address received from the first IWU.

2. The method of claim 1, wherein the step of redirecting is initiated upon reception of said access request in said first IWU, wherein access to the subscriber's core network by the subscriber terminal is allowed only through at least one predetermined access point and the at least one predetermined access point is not connected to said first IWU.

3. The method of claim 1, wherein said second access port is said subscriber's home access port, and wherein said core network does not provide mobility to subscriber terminals.

4. The method of claim 1, wherein the step of receiving said request for access in a first IWU further comprises receiving an initial message requesting a signaling connection to said core network.

5. The method of claim 1, wherein said first access port is connected to the first RNC, the first RNC serving a first plurality of base stations, wherein one of said first plurality of base stations receives said access request with a higher reception quality than any of a second plurality of base stations connected to a plurality of other RNCs.

6. The method of claim 1, wherein said subscriber terminal is not allowed to communicate with said subscriber's core network via said first access port.

7. The method of claim 1, wherein said subscriber terminal transmits a core network subscriber identity as a part of said access request.

8. The method of claim 7 further comprising the step of comparing, in said first IWU, said core network subscriber identity with a list of core network subscriber identities, wherein said list of identities represents subscriber identities allowed to access said core network through said first access port.

9. The method of claim 8, wherein said core network subscriber identity is not represented in said list of core network subscriber identities and said transmitting step further comprises the steps of:

correlating, in said first IWU, said core network subscriber identity with a mapping table, wherein said mapping table is a list of subscriber identities and, corresponding to said subscriber identities, network addresses to allowed access ports for communication with said core network; and reporting to said first RNC a corresponding address to an allowed access port for said core network subscriber identity for redirecting said access request.

10. The method of claim 9, wherein said first access port is connected to said subscriber's core network.

11. In a Generic Radio Access Network (GRAN) serving as a possible information bearer to a plurality of core networks, wherein each of said core networks has at least one subscriber having a mobile terminal and wherein at least one type of subscriber terminal consists of one GRAN specific part that logically belongs to the GRAN, one core network specific part that logically belongs to the core network, and an interworking part, a method for redirecting a core network access request from a first access port to a second access port wherein at least the second access port is connected to said subscriber's core network, wherein the core network access request is received from a core network subscriber terminal, the method comprising the steps of:

receiving, at a first interworking unit (IWU) connected to said first access port, a request for access to said subscriber's core network from said subscriber terminal;

transmitting, from said first IWU to a first radio network controller (RNC), an address to the second access port;

returning, from said first RNC to said subscriber terminal, the address to the second access port.

12. The method of claim 11, wherein said second access port is said subscriber's home access port, and wherein said core network does not provide mobility to subscriber terminals.

13. The method of claim 11, wherein the step of receiving said request for access in a first IWU further comprises receiving an initial message requesting a signaling connection to said core network.

14. The method of claim 11, wherein said first access port is connected to the first RNC, the first RNC serving a first plurality of base stations, wherein one of said first plurality of base stations receives said access request with a higher reception quality than any of a second plurality of base stations connected to a plurality of other RNCS.

15. The method of claim 11, wherein said subscriber terminal is not allowed to communicate with said subscriber's core network via said first access port.

16. The method of claim 11, wherein said subscriber terminal uses said address to said second access port to initiate a second core network access attempt addressed to said second access port.

17. The method of claim 16, wherein said subscriber terminal transmits a core network subscriber identity as a part of said access request.

18. The method of claim 17 further comprising the step of comparing, in said first IWU, said core network subscriber identity with a list of core network subscriber identities, wherein said list of identities represents subscriber identities allowed to access said core network through said first access port.

19. The method of claim 18, wherein said core network subscriber identity is not represented in said list of core network subscriber identities, further comprising the steps of:

correlating, in said first IWU, said core network subscriber identity with a mapping table, wherein said mapping table is a list of subscriber identities and, corresponding to said subscriber identities, network addresses to allowed access ports for communication with said core network; and wherein the step of returning said address to the second access port comprises the step of reporting to said first subscriber terminal a corresponding address to an allowed access port for said network subscriber identity for redirecting said access request.

20. The method of claim 19, wherein said first access port is connected to said subscriber's core network.

21. The method of claim 11, wherein the interworking part of the subscriber terminal stores the address of the correct access port to be used in subsequent access attempts by the same user in the same GRAN.

22. In a Generic Radio Access Network (GRAN) wherein a core network does not support mobility, a method of directing an access attempt by a user terminal having a core network specific part, a GRAN specific part, and an interworking part comprising the steps of:

attempting to access the core network from the user terminal through a closest one of a plurality of access ports;

establishing signaling between the interworking part of the terminal and an interworking unit (IWU) at the closest access port to which said core network is connected, wherein a request for signaling is included and transferred, uninterpreted by the GRAN as part of an initial message;

transferring the core network subscriber identity from the interworking part of the terminal to the IWU at the closest access port;

checking, at said IWU, to determine if said subscriber identity belongs to the closest access port;

establishing a connection between the core network specific part of the terminal and the core network if said subscriber identity belongs to said closest access port;

checking a mapping table in said IWU at the closest access port for the correct access port that maps to the subscriber identity if the subscriber identity does not belong to said closest access port, said mapping table mapping core network subscriber identities to access port addresses;

rejecting the access attempt if the subscriber identity is not on said mapping table; and if the subscriber identity is located on said mapping table, performing the steps of:

retrieving the correct access port address from the table;

returning the correct access port address to the interworking part of the terminal;

releasing said signaling between the core network specific part of the terminal and the IWU; and performing a new access attempt from said terminal, using the correct access port.

23. In a Generic Radio Access Network (GRAN) wherein a core network does not support mobility, a system used for directing an access attempt by a user terminal having a core network specific part and a GRAN specific part, comprising:

means for the user terminal attempting to access the core network through a closest one of a plurality of access ports using an initial message to a closest radio network controller (RNC) in the GRAN, said initial message requesting a signaling connection to the core network and wherein a request for signaling is included and transferred. uninterpreted by the GRAN as part of an initial message;

means for sending a core network subscriber identity of the user terminal as a part of said initial message;

means for transferring by said RNC the request for a signaling connection, including said core network subscriber identity, to an interworking unit (IWU) at the closest access port, wherein said core network is connected to the closest access port;

means for said IWU at said closest access port to determine if said subscriber identity belongs to said closest access port;

means for establishing a connection between the core network specific part of the terminal and the core network if the subscriber identity belongs to the closest access port;

means for checking a mapping table in said IWU at the closest access port for a correct access port address that corresponds to the subscriber identity, said mapping table mapping core network subscriber identities to access port addresses;

means for rejecting the access attempt if the subscriber identity is not on the mapping table;

means for the IWU retrieving the correct access port address from the mapping table if the subscriber identity is on the mapping table;

means for the IWU returning the correct access port address to the RNC; and means for the RNC rerouting the access attempt to the correct access port.

24. In a Generic Radio Access Network (GRAN) wherein a core network does not support mobility, a system for directing an access attempt by a user terminal having a core network specific part, a GRAN specific part, and an interworking part, comprising:

terminal means for attempting to access the core network through a closest one of a plurality of access ports;

means for establishing signaling between the interworking part of the terminal and an interworking unit (IWU) at the closest access port, wherein said core network is connected to the closest access port;

means for the interworking part of the terminal transferring a core network subscriber identity for the user terminal to the IWU at the closest access port;

means for said IWU to determine if said subscriber identity belongs to the closest access port;

means for establishing a connection between the core network specific part of the terminal and the core network if the subscriber identity belongs to the closest access port;

means for checking a mapping table in said IWU at the closest access port for a correct access port address that corresponds to the subscriber identity, said mapping table mapping core network subscriber identities to access port addresses;

means for rejecting the access attempt if the subscriber identity is not on the mapping table;

means for retrieving, by said IWU, the correct access port address from the mapping table if the subscriber identity is on the mapping table;

means for the IWU to return the correct access port address to the interworking part of the terminal;

means for releasing the signaling between the interworking part of the terminal and the IWU; and means for said terminal performing a new access attempt, using the correct access port address.

* * * * *

UNITED STATES PATENT AND TRADEMARK OFFICE
CERTIFICATE OF CORRECTION

PATENT NO. : 6,151,495
DATED : November 21, 2000
INVENTOR(S) : Johan Rune

Page 1 of 1

It is certified that error appears in the above-identified patent and that said Letters Patent is hereby corrected as shown below:

<u>Title page,</u> under "Foreign Application Priority Data" delete "9703696" and insert -- 9703696-6 --.

<u>Title page,</u> under "Foreign Patent Documents" delete "0 697 798" and insert -- EP 0 697 798 --.

Signed and Sealed this

Eighteenth Day of September, 2001

Attest:

Nicholas P. Godici

NICHOLAS P. GODICI
*Acting Director of the United States Patent and Trademark Office*

*Attesting Officer*